(12) United States Patent
Tompsett

(10) Patent No.: US 6,446,985 B1
(45) Date of Patent: Sep. 10, 2002

(54) TWO-WHEEL-DRIVE BICYCLE

(76) Inventor: Joe Tompsett, 2126 Clarence Ave., Racine, WI (US) 53405

( * ) Notice: Subject to any disclaimer, the term of this patent is extended or adjusted under 35 U.S.C. 154(b) by 0 days.

(21) Appl. No.: 09/784,485

(22) Filed: Feb. 15, 2001

(51) Int. Cl.[7] .............................................. B62M 17/00
(52) U.S. Cl. ............................................ 280/30; 280/259
(58) Field of Search ................................. 280/230, 259, 280/260, 261

(56) References Cited

U.S. PATENT DOCUMENTS

| 4,029,332 A | 6/1977 | Davis |
| 4,397,369 A | 8/1983 | Read |
| 4,666,172 A | 5/1987 | Hartmann |
| 4,895,385 A | * 1/1990 | Becoat ...................... 280/259 |
| 4,941,651 A | 7/1990 | Phillips |
| 4,969,642 A | 11/1990 | Phillips |
| 5,052,705 A | 10/1991 | Ringle |
| 5,116,070 A | 5/1992 | Becoat |
| 5,152,729 A | 10/1992 | Phillips |
| 5,158,314 A | 10/1992 | Farras |
| 5,184,838 A | 2/1993 | Becoat |
| 5,224,725 A | 7/1993 | Eriston |
| 5,324,057 A | 6/1994 | Chartrand |
| 5,326,121 A | 7/1994 | Fisher |
| 5,332,244 A | 7/1994 | Turner et al. |
| 5,390,946 A | 2/1995 | Spicer |
| 5,542,689 A | 8/1996 | Chalfant |
| 5,816,598 A | 10/1998 | Dodakian |
| 6,068,279 A | 5/2000 | Dion |
| 6,182,991 B1 | * 2/2001 | Christini et al. ............ 280/230 |

FOREIGN PATENT DOCUMENTS

| GB | 2240523 A | * 8/1991 | .......... B62M/23/00 |
| WO | WO 9112167 A2 | * 8/1991 | .......... B62M/23/00 |

* cited by examiner

*Primary Examiner*—Kevin Hurley
(74) *Attorney, Agent, or Firm*—Jansson, Shupe & Munger, Ltd.

(57) ABSTRACT

An improved two-wheel-drive bicycle having, in certain preferred forms, a chain-driven front-drive mechanism having a gearing arrangement attached to the fork assembly, whereby the gear arrangement, using fixed-axis and variable-axis turning members, transfers rotational power from the drive mechanism along and around the steering axis to the front sprocket. Certain preferred embodiments include particular gearing arrangements and particular ways of getting bicycle power to the fixed-axis turning members,

22 Claims, 10 Drawing Sheets

TWO-WHEEL-DRIVE BICYCLE

FIELD OF THE INVENTION

This invention relates generally to bicycles, and in particular to two-wheel-drive bicycles.

BACKGROUND OF THE INVENTION

Bicycles have traditionally operated as a single-wheel-drive vehicle. As is evidenced by their popularity, single-wheel-drive bicycles are suitable in most cases. Because they only employ single-wheel drive, however, the use of bicycles are, for the most part, somewhat limited to prepared surfaces such as paved streets, sidewalks, and groomed paths. Although just about everyone who has ever ridden a bicycle has ridden on gravel or unprepared surfaces, all riders know that it is more difficult to ride on these types of surfaces due to the fact that drive is being generated by only the rear wheel.

In any event, single-wheel-drive bicycles are the norm because of difficulties involved in transferring to the front wheel the drive generated by the rider. The difficulty in generating drive via the front wheel of a bicycle results from the need to allow the fork (on which the front wheel is mounted) freedom to turn substantially in either direction from the center position in order to permit the cyclist to steer the bicycle. Because the fork must be free to turn, it is not possible to directly connect the pedals to the front wheel.

While two-wheel-drive bicycles have been proposed, there remains need for an easily-operable and readily steerable two-wheel-drive bicycle, so that riders will have greater opportunity for enjoyable cycling on off-road trails and other unprepared surfaces. Therefore, a two-wheel-drive bicycle overcoming various problems and shortcomings of the prior art would be an important improvement in the art.

OBJECTS OF THE INVENTION

An object of the invention is to provide a two-wheel-drive bicycle that overcomes some of the problems and shortcomings of the prior art.

Another object of the invention is to provide a two-wheel-drive bicycle that allows the fork assembly to freely turn in order to steer the bicycle.

Still another object of the invention is to provide a bicycle that includes a gear arrangement that allows both wheels to act as drive wheels.

Yet another object of the invention is to provide a two-wheel-drive bicycle that can be converted to a single-wheel-drive bicycle.

How these and other objects are accomplished will become apparent from the following descriptions and from the drawings.

SUMMARY OF THE INVENTION

The invention involves an improvement to a two-wheel-drive bicycle that includes: (1) a frame having front and rear portions and a center portion with upper and lower ends; (2) a fork assembly attached to the front portion and pivotable about a steering axis; (3) a front wheel on the fork assembly, the front wheel having a front sprocket; (4) a rear wheel on the rear portion, the rear wheel having a rear sprocket and (5) a drive mechanism that includes a main-drive sprocket at the lower end of the center portion. The improvement comprises a chain-driven front-drive mechanism having a gear arrangement attached to the fork assembly, whereby the gear arrangement transfers rotational power from the drive mechanism along the steering axis to the front sprocket. With the chain-driven front wheel, as with typical bicycle back wheels, a free-wheeling ratcheting may be included.

In a first embodiment of the invention, the gear arrangement of the two-wheel-drive bicycle further includes a fixed-axis intermediate rotatable transfer device that is attached to the front portion of the frame and mechanically engaged to the drive mechanism. A variable-axis intermediate rotatable transfer device is attached to the fork assembly and mechanically engaged to the front sprocket, and a drive-transfer wheel capable of rotation is attached to the fork assembly and engaged between the fixed-axis intermediate and variable-axis intermediate transfer devices in such a manner that the drive-transfer wheel mechanically links the front sprocket with the main-drive sprocket while allowing bicycle steering.

In one version of the first embodiment, the fixed-axis intermediate rotatable transfer device includes a rotary-drive input sprocket and the variable-axis intermediate rotatable transfer device includes a rotary-drive output sprocket. In a particular version of such embodiment, a front chain engages the variable-axis intermediate rotatable transfer device to the front sprocket. Furthermore, a transverse sprocket arrangement is connected to the center portion between the main-drive-sprocket and the top end of the center portion. A first transverse-drive chain engages the transverse sprocket arrangement and extends to the fixed-axis intermediate rotatable transfer device, and a second transverse-drive chain engages the transverse sprocket arrangement and extends to the rear sprockets.

In a still more particular version of the first embodiment, the transverse sprocket arrangement includes a first central-drive sprocket attached to the center portion and a second central-drive sprocket attached to the center portion and coaxially connected to the first central-drive sprocket. Furthermore, the transverse-drive chain includes a first chain extending from the fixed-axis intermediate rotatable transfer device to the first central-drive sprocket and a second chain extending from the second central-drive sprocket to the rear sprocket. In still another version of the embodiment, a clutch is used such that the front-drive mechanism can be disengaged from the main-drive-sprocket.

In still another embodiment of the invention, the fixed-axis intermediate rotatable transfer device rotates about a center axis and the drive-transfer wheel assembly has a center axis perpendicular to the center axis of the fixed-axis intermediate rotatable transfer device. In a particular version of this embodiment, the drive transfer wheel has a center axis, the fixed-axis intermediate rotatable transfer device and the variable-axis intermediate rotatable transfer device each rotate about a center axis, and the axes of the fixed-axis intermediate rotatable transfer device and the variable-axis intermediate rotatable transfer device are substantially perpendicular to the center axis of the drive transfer wheel. In still another version, the fixed-axis intermediate rotatable transfer device is attached to a side of the front portion of the frame opposite the variable-axis intermediate rotatable transfer device.

In a preferred version of the first embodiment, the gear arrangement includes a fixed-axis intermediate sprocket assembly rotatably attached to the front portion and having a first input sprocket mechanically engaged to the drive mechanism and a first output sprocket. A variable-axis intermediate sprocket assembly capable of rotating is attached to the fork assembly and includes a second input sprocket and a second output sprocket mechanically engaged to the front sprocket, and a drive-transfer wheel circumscribing and rotatably attached to the fork assembly and mechanically engaged to the first output sprocket and the second input sprocket, thereby providing front-wheel drive while allowing pivoting of the fork assembly for bicycle steering.

In the most preferred embodiment of the invention, the gear arrangement comprises: (1) a fixed-axis intermediate sprocket assembly rotatably attached to the front portion and having a first input sprocket mechanically engaged to the drive mechanism and a first output sprocket; (2) a first fixed-axis gear wheel attached to the front portion and mechanically engaged to the fixed-axis intermediate sprocket; (3) a second gear wheel engaged with the first fixed-axis gear wheel, the second gear wheel circumscribing the steering axis; (4) a drive shaft oriented along the steering axis, the drive shaft having a first and second end, where the first end is connected to the second gear wheel and the second end is connected to a third gear wheel oriented parallel to the second gear wheel; and (5) a fourth gear wheel engaged with the third gear wheel and mechanically engaged to the front sprocket.

In one version of the most preferred embodiment, the first, second, third and fourth gear wheels are beveled gears.

In still another version of the most preferred embodiment, a transverse-drive chain engages the fixed-axis intermediate sprocket assembly with a transverse sprocket arrangement that is connected to the center portion between the main-drive-sprocket and the top end of the center portion.

In still another version of the most preferred embodiment, the-transverse sprocket arrangement includes a first central-drive sprocket attached to the center portion and a second central-drive sprocket attached to the center portion and coaxially connected to the first central-drive sprocket. In yet another version, the transverse-drive chain includes a first chain extending from the fixed-axis intermediate sprocket assembly to the first central-drive sprocket and a second chain extending from the second central-drive sprocket to the rear sprocket. In still another version, the two-wheel-drive bicycle includes a clutch, whereby the front-drive mechanism can be disengaged from the main-drive sprocket.

In yet another version of the preferred embodiment, a front-drive chain transfers rotational drive from the fourth gear wheel to the front-sprocket wheel.

BRIEF DESCRIPTION OF THE DRAWINGS

The drawings furnished herewith illustrate preferred embodiments of the present invention in which the above advantages and features are clearly disclosed. In the drawings.

DETAILED DESCRIPTION OF PREFERRED EMBODIMENTS

Figure 1:
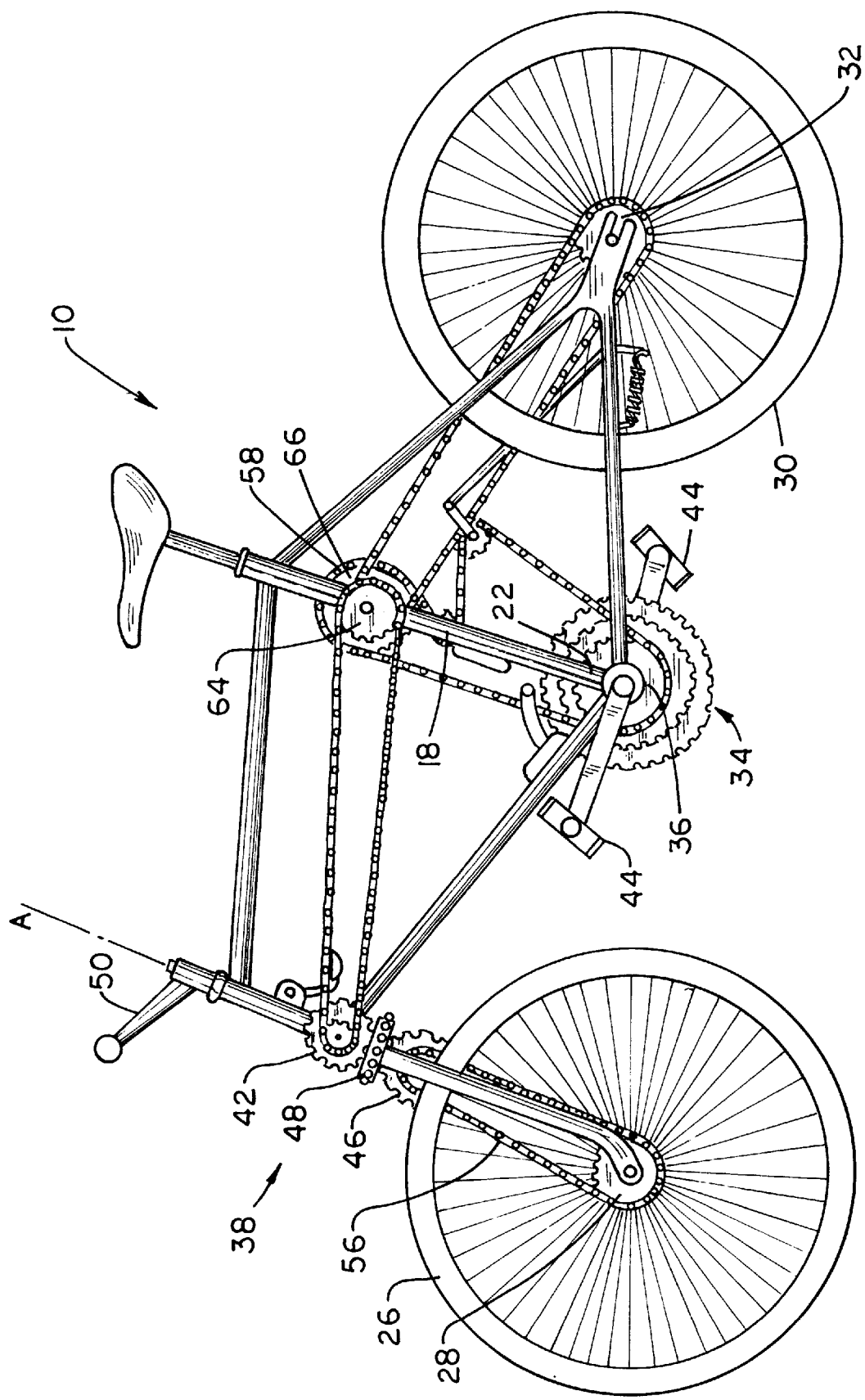
FIG. 1 is a side view showing the left side of a two-wheel-drive bicycle in accordance with this invention.
Figure 2:
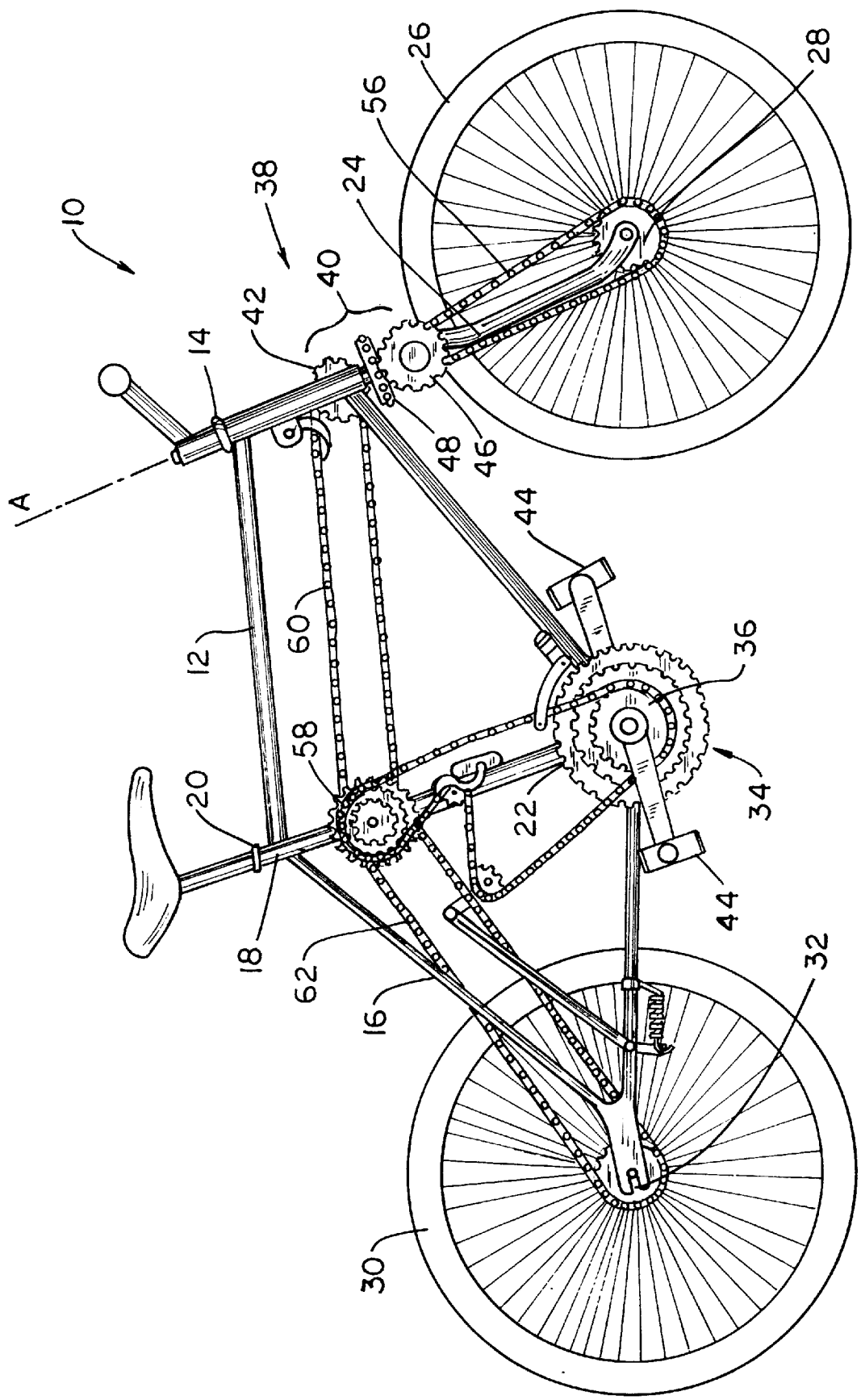
FIG. 2 is a side view showing the right side of the two-wheel-drive bicycle of FIG. 1.
Figure 3:
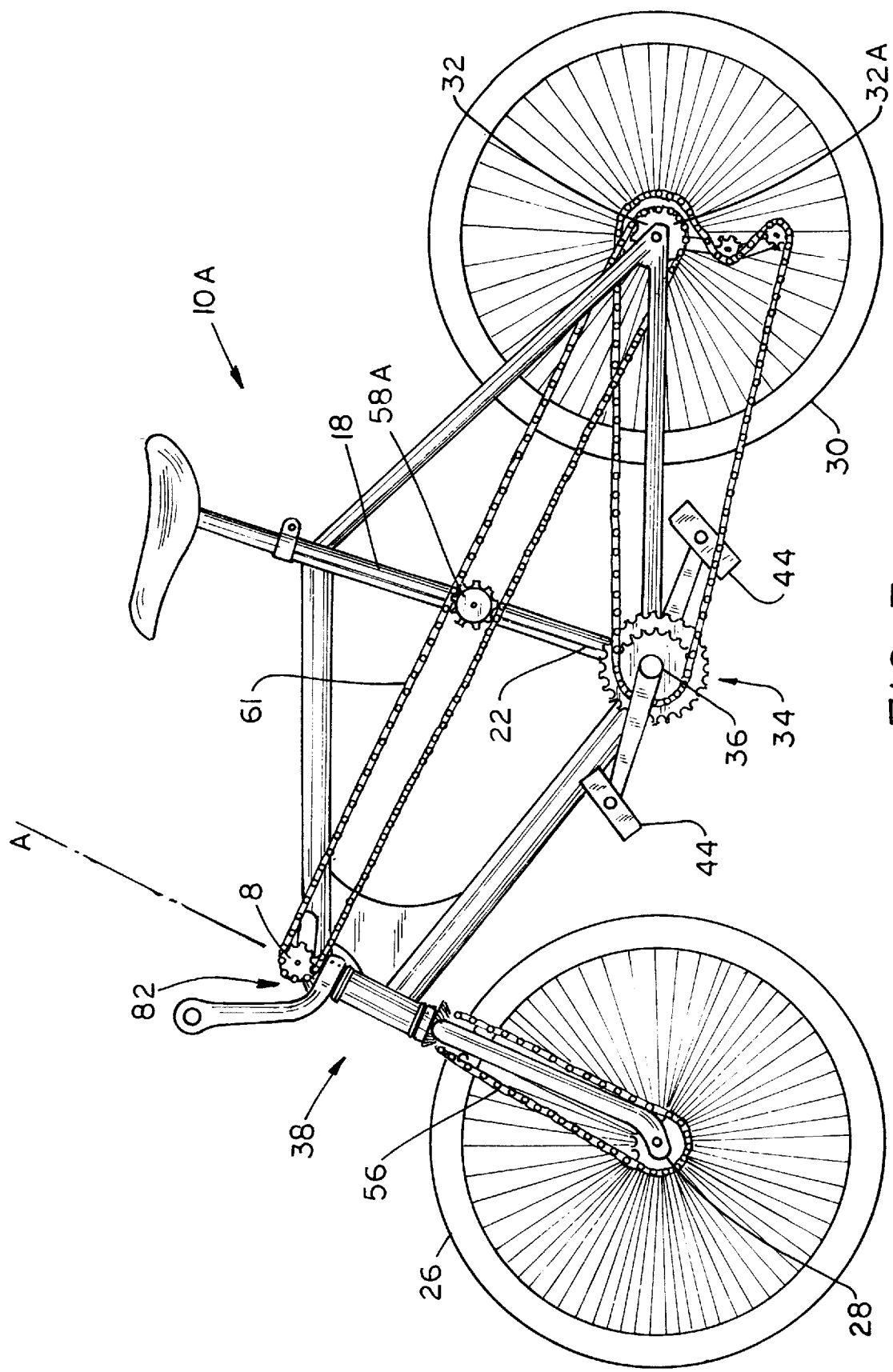
FIG. 3 is a side view showing the left side of an alternative embodiment of the two-wheel-drive bicycle of this invention.

As shown in FIGS. 1–3, which show two preferred embodiments 10 and 10A of the invention, the invention involves a two-wheel-drive bicycle that includes: (1) a frame 12 having front and rear portions 14 and 16 and a center portion 18 with upper and lower ends 20 and 22; (2) a fork assembly 24 attached to front portion 14 and pivotable about a steering axis A; (3) a front wheel 26 on the fork assembly, the front wheel having a front sprocket 28; (4) a rear wheel 30 on rear portion 16, rear wheel 30 having a main rear sprocket 32; and (5) a drive mechanism 34 that includes a main-drive sprocket 36 at lower end 22 of center portion 18. The improvement involves a chain-driven front-drive mechanism 38, shown in various forms in the illustrated embodiments of this invention, and related driving apparatus. For example, in the embodiment of FIGS. 1 and 2, front-drive mechanism 38 has a gear arrangement 40 attached to fork assembly 24, whereby gear arrangement 40 transfers rotational power from drive mechanism 34 along steering axis A to front sprocket 28.

Two-wheel-drive bicycles 10 and 10A allow the rider to traverse unimproved terrain as greater traction is generated using two drive wheels than with conventional one-wheel-drive bicycles. In one embodiment, as shown in FIGS. 1, 2, 4 and 8, in order to generate greater traction, gear arrangement 40 of two-wheel-drive bicycle 10 includes a fixed-axis intermediate rotatable transfer device 42 that is attached to front portion 14 of frame 12 and mechanically engaged to drive mechanism 34 which also includes the pedals 44 and the related components necessary to connect pedals 44 to main-drive sprocket 36. A variable-axis intermediate transfer device 46 capable of rotation is attached to fork assembly 24 and mechanically engaged to front sprocket 28, and a drive-transfer wheel 48 capable of rotation is attached to fork assembly 24 and engaged between fixed-axis intermediate and variable-axis intermediate transfer devices 42 and 46, in such a manner that drive-transfer wheel 48 mechanically links front sprocket 28 with main-drive sprocket 36 while allowing bicycle steering. Further details of this steerable front gearing arrangement are set forth below.

When in operation, the rider generates the drive force by pedaling the two-wheel-drive bicycle 10 in the conventional manner that is well known in the art. As the rider pedals, the drive force is transferred via mechanical linkage to both rear and front wheels 30 and 26. While various forms of mechanical linkage would be encompassed within the spirit of the invention, a sprocket-engaging chain similar to what is currently used on a bicycle is the preferred device for mechanically linking drive mechanism 34 to front and rear wheels 26 and 30.

Figure 4:
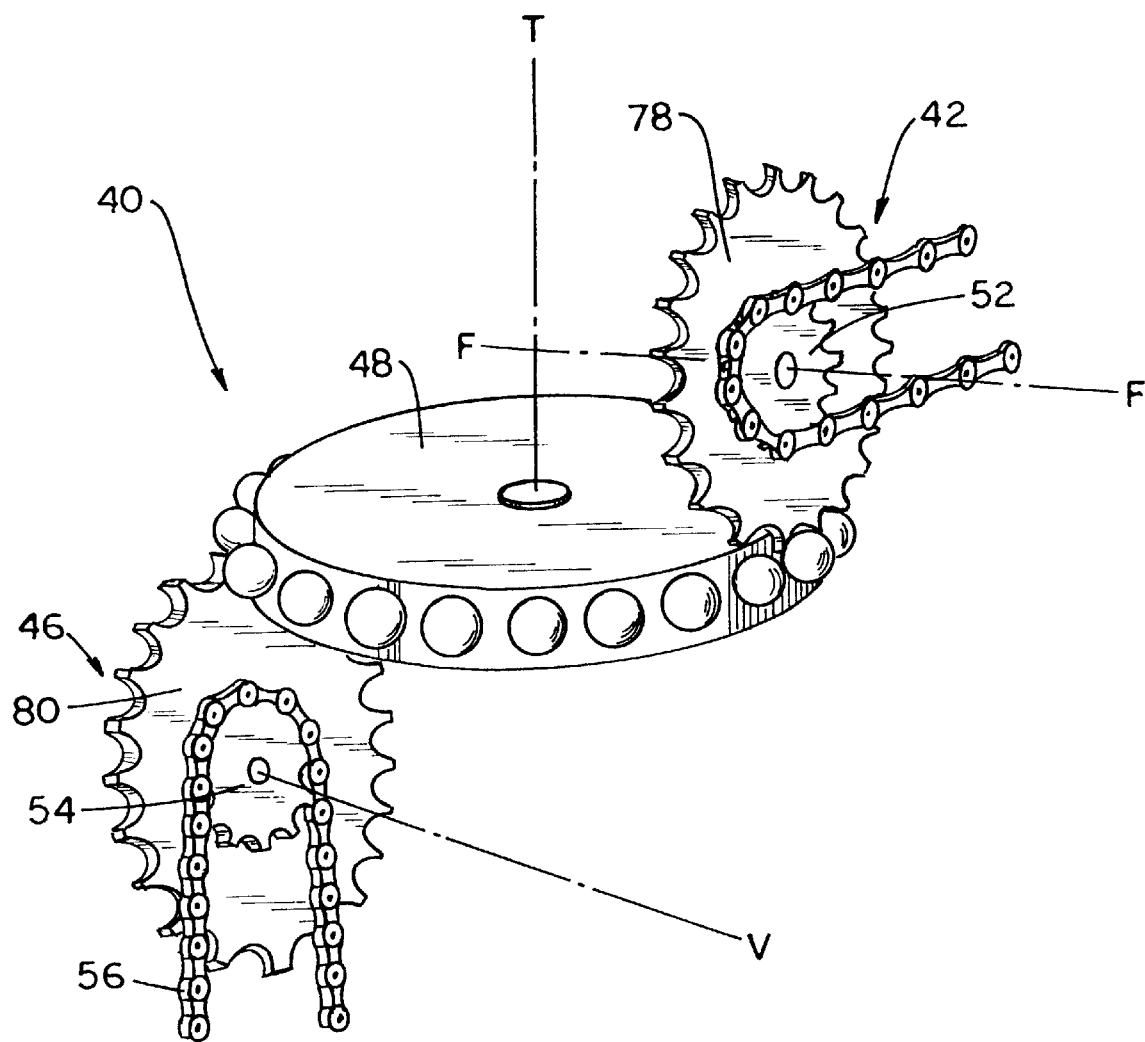
FIG. 4 is a schematic perspective view of the front gear arrangement for the two-wheel-drive bicycle of FIGS. 1 and 2.
Figure 8:
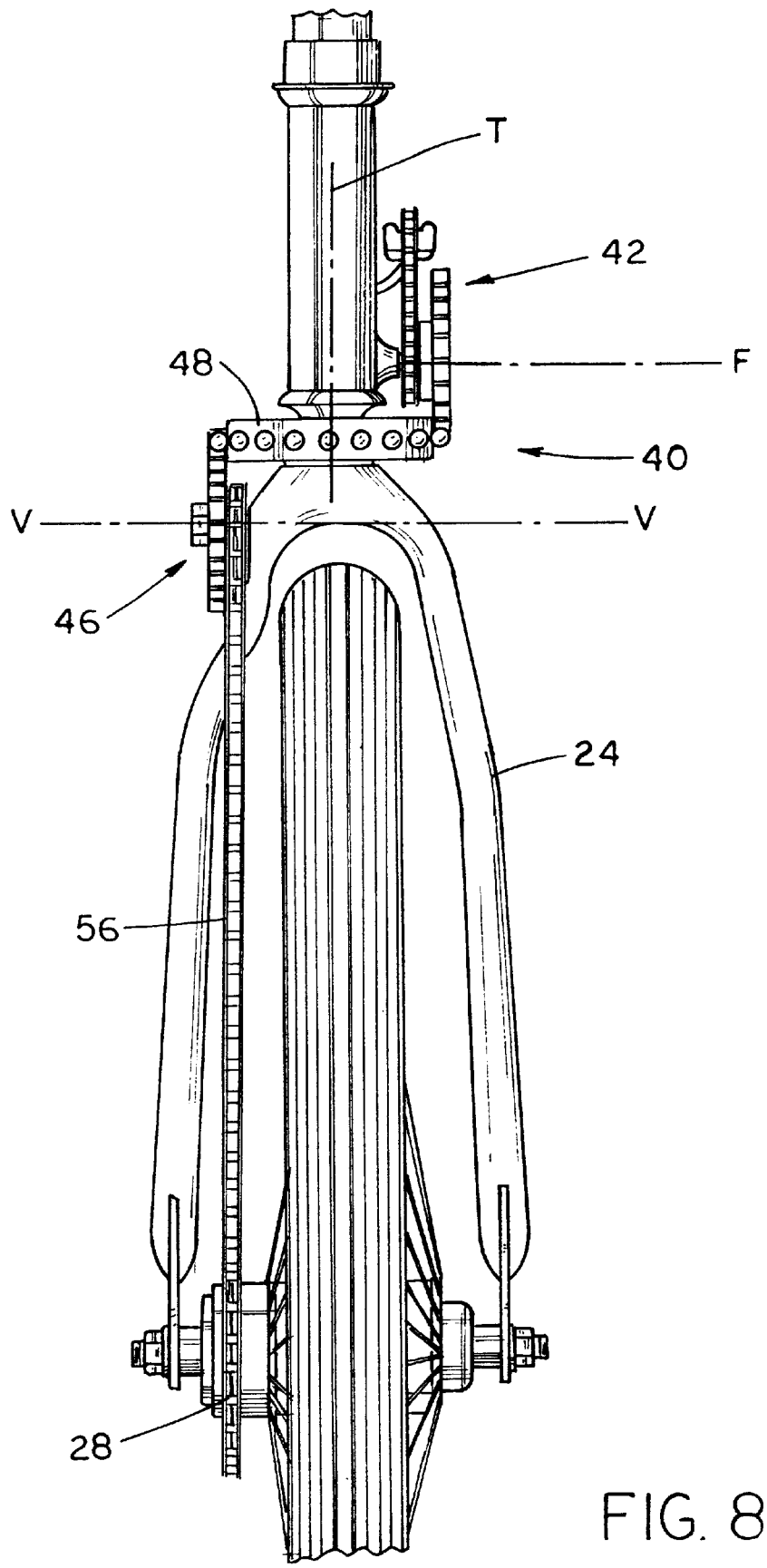
FIG. 8 is a front view of the fork assembly showing the front gear arrangement of the two-wheel-drive bicycle of FIGS. 1 and 2.

As shown best in FIGS. 4 and 8, fixed-axis intermediate gear arrangement 42 is one in which the axis F around which the gear rotates remains fixed substantially perpendicular to frame 12 of bicycle 10. Variable-axis intermediate gear arrangement 46 rotates around an axis V that varies in relation to frame 12 as front wheel 26 is turned. That is, variable-axis intermediate gear 46 rotates around an axis that is perpendicular to frame 12 when front 26 and rear 30 wheels are aligned in tandem. When front wheel 26 is turned, however, axis V about which variable-axis intermediate gear 46 rotates does not remain perpendicular to frame 12. This is because variable-axis intermediate gear 46 tracks around the circumference of drive-transfer wheel 48. Such tracking is caused by the rotation of drive-transfer wheel 48 that results from the engagement of drive-transfer wheel 48 with rotating fixed-axis intermediate gear 42.

This gear arrangement permits the rider to freely turn the bicycle handle bars 50 thereby turning fork assembly 24. Such turning can be accomplished without the need to adjust the tension in the mechanical linkage or accelerating the rotation of front wheel 26 in relation to rear 30. This allows for the smooth, safe operation of two-wheel-drive bicycle 10.

In the embodiment shown in FIGS. 1, 2, 4 and 8, fixed-axis intermediate rotatable transfer device 42 includes a rotary-drive input sprocket 52 and variable-axis intermediate rotatable transfer device 46 includes a rotary-drive output sprocket 54. In a particular version of such embodiment, a front chain 56 engages variable-axis intermediate rotatable transfer device 46 to front sprocket 28. Furthermore, as shown in FIGS. 1 and 2, a transverse idler sprocket arrangement 58 is connected to center portion 18 between main-drive-sprocket 36 and top end 20 of center portion 18. extends to fixed-axis intermediate rotatable transfer device 42, and a second transverse-drive chain 62 engages transverse sprocket arrangement 58 and extends to rear sprocket 32. More specifically, transverse sprocket arrangement 58 includes a first central-drive sprocket 64 attached to center portion 18 and a second central-drive sprocket 66 attached to center portion 18 and coaxially connected to first central-drive sprocket 64. The transverse-drive chain arrangement includes a first chain 60 extending from fixed-axis intermediate rotatable transfer device 42 to first central-drive sprocket 64 and a second chain 62 extending from second central-drive sprocket 66 to rear sprocket 32.

FIG. 3 shows an alternative arrangement in which the driving force for front wheel 26 is transferred there via chain 61 from a secondary rear sprocket 32A which is affixed to rear sprocket 32. In this example, a simpler idler sprocket arrangement 58A is used—a single sprocket which merely guides chain 61 and maintains appropriate tension therein. In such embodiment, a rear-hub clutch is used.

While the use of sprockets is preferred, such an embodiment does not preclude the use of some other type of wheel or cylinder.

Figure 5:
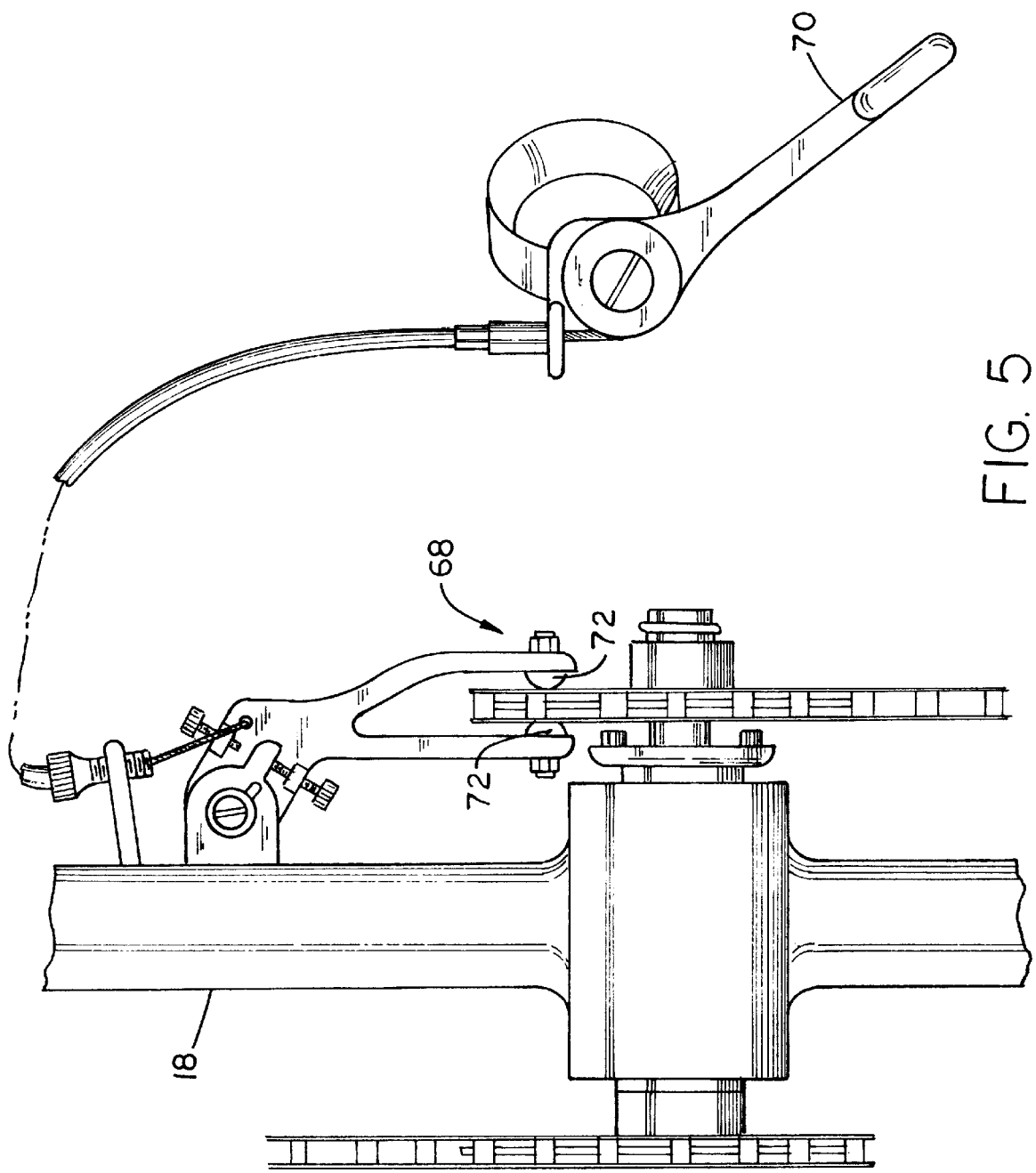
FIG. 5 is a front view of a clutch engaged to the center portion of a frame of such two-wheel-drive bicycle.
Figure 6:
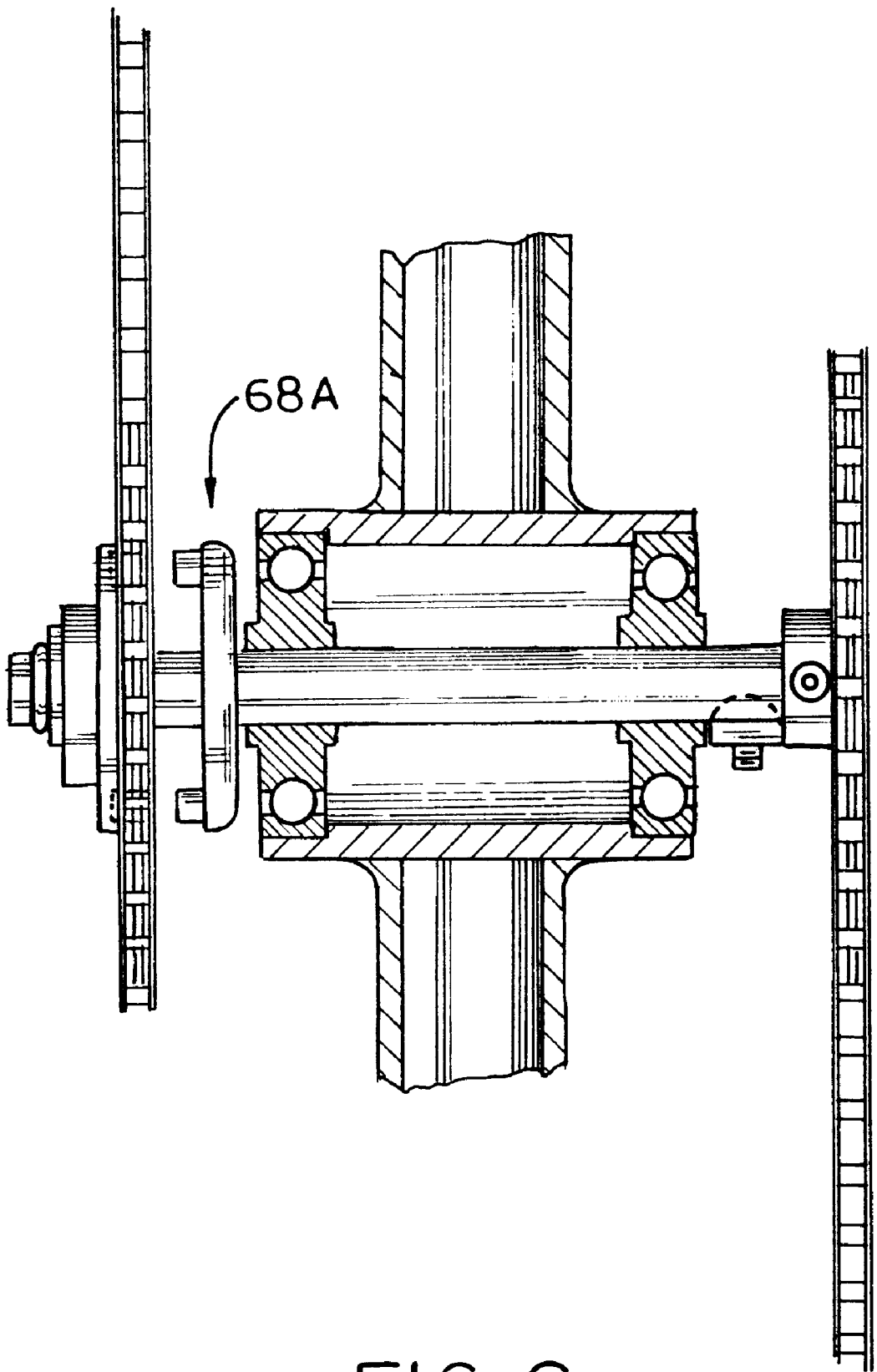
FIG. 6 is a sectional view of the clutch assembly.
Figure 7:
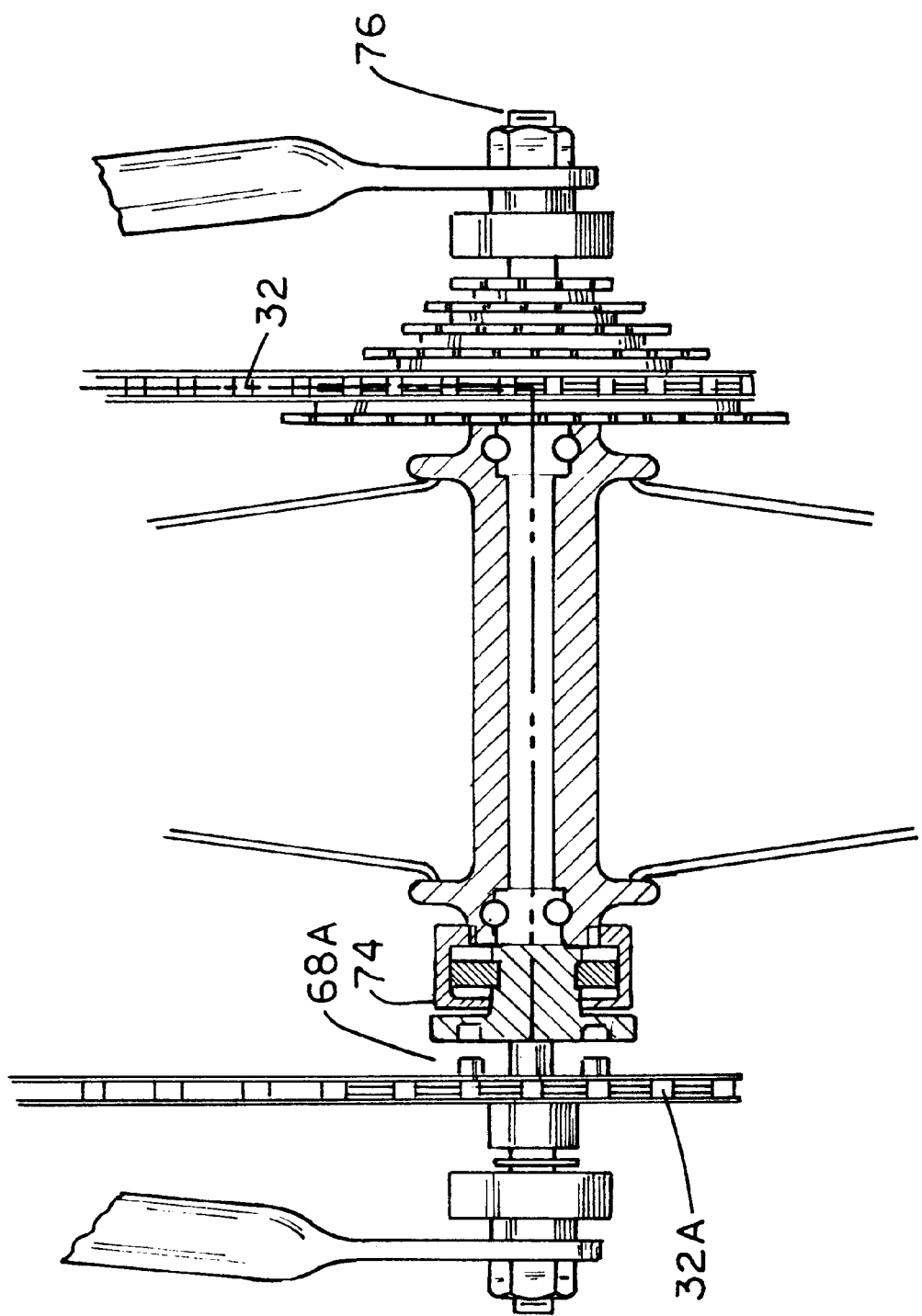
FIG. 7 is a sectional view showing the clutch assembly mounted on the rear hub of a two-wheel-drive bicycle.

In other versions, a clutch 68, as illustrated in FIGS. 5–7, is used such that front-drive mechanism 38 can be disengaged from main-drive sprocket 36. Various types of clutches 68 are suitable for disengaging front-drive mechanism 38 from main-drive sprocket 36. However, one version, shown in FIG. 5, involves the use of an engagement clutch 68 positioned on center portion 18 so as to be capable of engaging first central-drive sprocket 64. When in operation, the rider positions a lever 70 thereby causing pads 72 on clutch 68 to engage first central-drive sprocket 64. This engagement connects front sprocket 28 to main-drive sprocket 36. In another preferred version, shown in FIGS. 6 and 7, a clutch 68A is positioned so as to engage a ratchet assembly 74 located along the rear hub 76. In such embodiment, ratchet assembly 74 either transmits power to hub 76 or allows hub 76 to freewheel in the same manner as a standard single-wheel-drive bicycle.

Returning again to description of front gearing arrangement 40, as shown best in FIGS. 4 and 8, as already noted fixed-axis intermediate rotatable transfer device 42 rotates about axis F, and it is preferred that drive-transfer wheel assembly 48 has a center axis T which is perpendicular to and intersecting with axis F. Axis T is coaxial with the main axis about which the fork of the bicycle turns during steering. Fixed-axis intermediate rotatable transfer device 42 is attached to a side of front portion 14 of frame 12 which is opposite the position of variable-axis intermediate rotatable transfer device 46.

As shown in FIGS. 4 and 8, gear arrangement 40 includes a fixed-axis intermediate sprocket assembly 42 rotatably attached to front portion 14 and having a first input sprocket 52 mechanically engaged to drive mechanism 34 and a first output sprocket 78. A variable-axis intermediate sprocket assembly 46 capable of rotating is attached to fork assembly 24 and includes a second input sprocket 80 and a second output sprocket 54 mechanically engaged to front sprocket 28, and a drive-transfer wheel 48 circumscribing and rotatably attached to fork assembly 24 and mechanically engaged to first output sprocket 78 and second input sprocket 80, thereby providing front-wheel drive while allowing pivoting of fork assembly 24 for bicycle steering.

Figure 9:
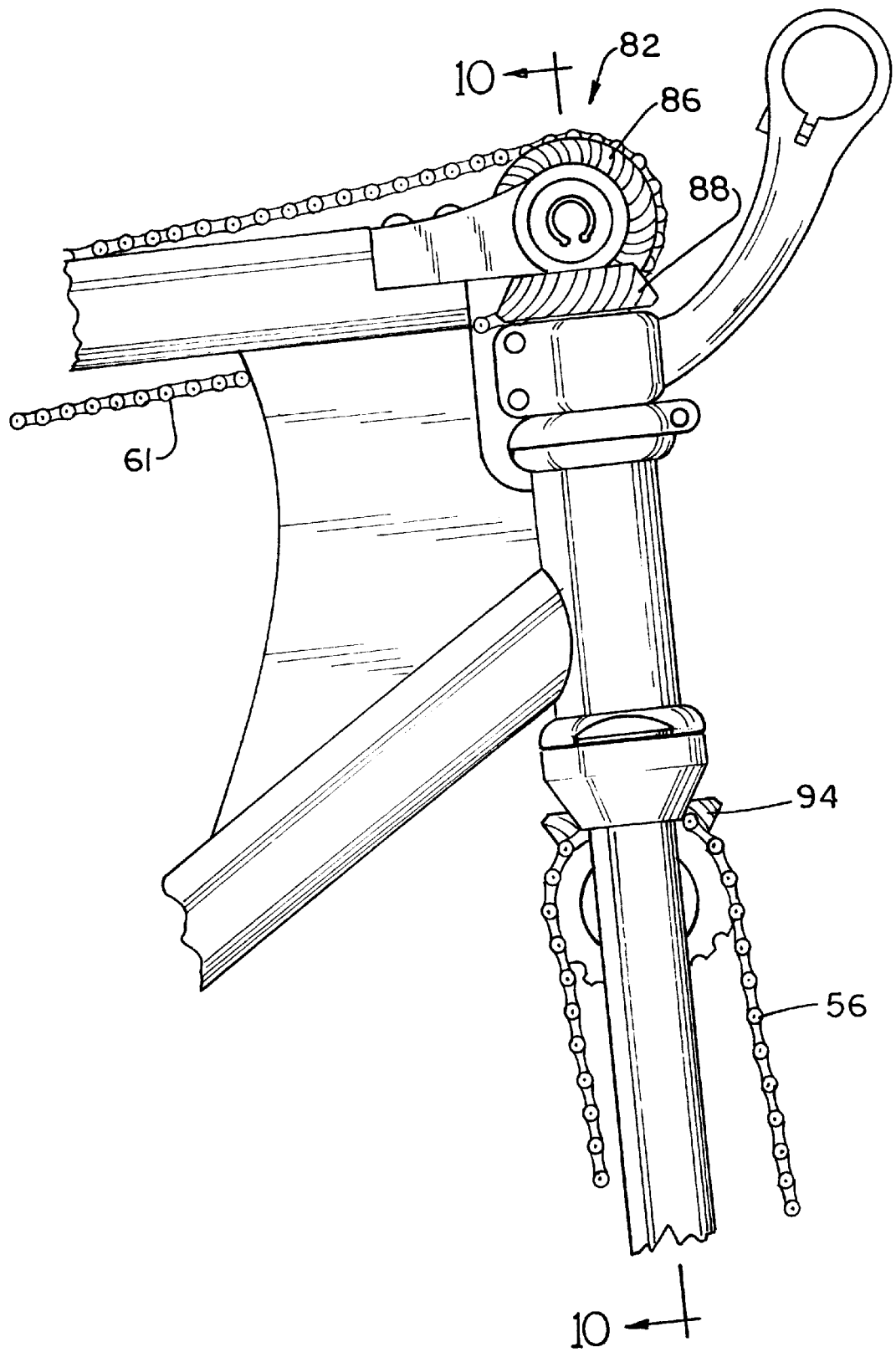
FIG. 9 is a right side elevation of the front portion of the frame of the two-wheel-drive bicycle of FIG. 3, showing one preferred embodiment of the front gear arrangement.
Figure 10:
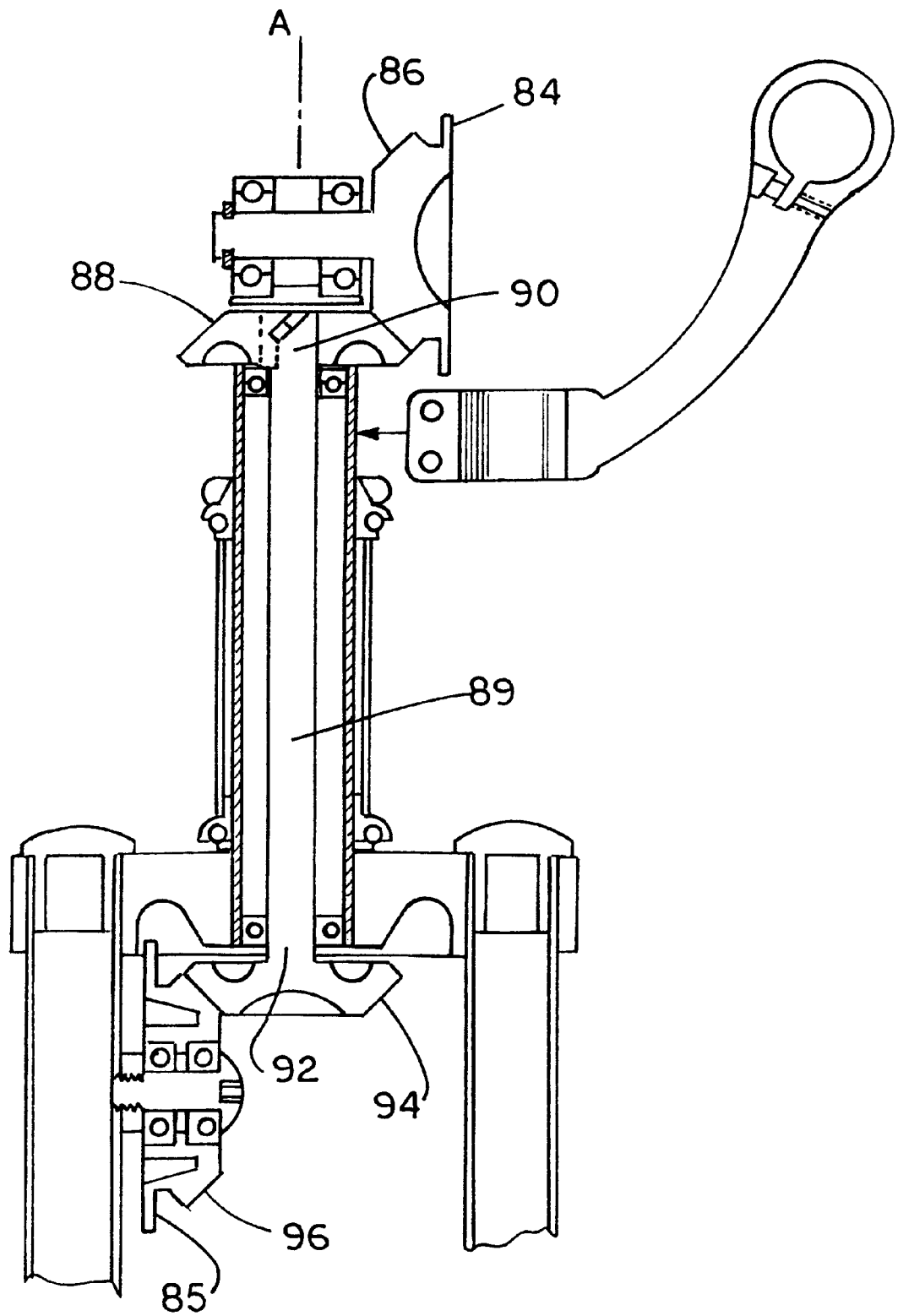
FIG. 10 is a side sectional of the apparatus of FIG. 9, taken along section 10—10 as indicated in FIG. 9.

In a highly most preferred embodiment of the invention, illustrated by FIGS. 3, 9 and 10, the front gearing arrangement includes: (1) a fixed-axis intermediate sprocket assembly 82 rotatably attached to front portion 14 and having a first input sprocket 84 mechanically engaged to drive mechanism 34 and an output sprocket 85; (2) a first fixed-axis gear wheel 86 attached to the front portion and mechanically engaged to fixed-axis intermediate sprocket 84; (3) a second gear wheel 88 engaged with first fixed-axis gear wheel 84 and circumscribing the steering axis A; (4) a drive shaft 89 (see FIG. 10) oriented along the steering axis A and having first and second ends 90 and 92, where first end 90 is connected to second gear wheel 88 and second end 92 is connected to a third gear wheel 94 oriented parallel to second gear wheel 88; and (5) a fourth gear wheel 96 engaged with third gear wheel 94 and mechanically engaged to output sprocket 85, and from there to front sprocket 28 by means of chain 56 (see FIGS. 3 and 9). First, second, third and fourth gear wheels 86, 88, 94 and 96 are beveled gears having spiral gear faces.

When in operation, a sprocket chain 61 (see FIG. 9) transfers power to first fixed-axis gear wheel 86 via sprocket 84. This causes first fixed-axis gear wheel 86 to rotate. Such rotation cause the rotation of second gear wheel 88 which results in rotation of drive shaft 89. The rotation of drive shaft 89 causes third gear wheel 94 to rotate which results in the rotation of fourth gear wheel 96, and thus the rotation of output sprocket 85, which in turn causes sprocket 28 and front wheel 26 to turn. This arrangement, as by now is apparent, does not in any way interfere with steering of two-wheel-drive bicycle 10A, because the upper pair of beveled gears involves transfer of driving force from a fixed-axis gear to a variable-axis gear, which generates drive power to front wheel 26 in any turning orientation.

While two-wheel drive bicycle 10A illustrated in FIGS. 3, 9 and 10 is shown as receiving power to the front via chain 61, which extends from the rear wheel area, fixed intermediate sprocket assembly 82 can alternatively be driven by the chain 60 of the arrangement illustrated in FIGS. 1 and 2. Indeed, within the spirit of this invention, a number of alternative approaches are possible.

As used herein, the terms "gear arrangement" or "gearing arrangement" or the like are not, as should be apparent, in any sense limited to arrangements involving toothed gears. Instead, any common sorts of mechanical power-transferring devices, obviously including without limitation sprockets, chains and the like, can be used.

While the principles of the invention have been shown and described in connection with but a few embodiments, it is to be understood clearly that such embodiments are by way of example and not limiting. Various modes of carrying out the invention are contemplated as being within the scope of the following claims particularly pointing out and distinctly claiming the subject matter which is regarded as the invention.

What is claimed is:

1. In a two-wheel-drive bicycle including a frame having front and rear portions and a center portion with upper and lower ends, a fork assembly attached to the front portion and pivotable about a steering axis, a front wheel on the fork assembly and having a front sprocket, a rear wheel on the rear portion and having a rear sprocket, and a drive mechanism including a main-drive sprocket at the lower end of the center portion, the improvement comprising a chain-driven front-drive mechanism having a gear arrangement attached to the fork assembly, whereby the gear arrangement transfers rotational power from the drive mechanism along the steering axis to the front sprocket.

2. The two-wheel-drive bicycle of claim 1 wherein the gear arrangement further includes:
   a fixed-axis intermediate rotatable transfer device attached to the front portion and mechanically engaged to the drive mechanism;
   a variable-axis intermediate rotatable transfer device attached to the fork assembly and mechanically engaged to the front sprocket; and
   a drive-transfer wheel rotatably attached to the fork assembly and engaged between the fixed-axis intermediate and variable-axis intermediate transfer device,
   whereby the drive-transfer wheel mechanically links the front sprocket with the main-drive sprocket while allowing bicycle steering.

3. The two-wheel-drive bicycle of claim 2 wherein:
   the fixed-axis intermediate rotatable transfer device includes a rotary-drive input sprocket; and
   the variable-axis intermediate rotatable transfer device includes a rotary-drive output sprocket.

4. The two-wheel-drive bicycle of claim 3 wherein a front chain engages the variable-axis intermediate rotatable transfer device to the front sprocket.

5. The two-wheel-drive bicycle of claim 4 further comprising:
   a transverse sprocket arrangement connected to the center portion between the main-drive-sprocket and the top end of the center portion;
   a first transverse-drive chain engaging the transverse sprocket arrangement and extending to the fixed-axis intermediate rotatable transfer device; and
   a second transverse-drive chain engaging the transverse sprocket arrangement and extending to the rear sprocket.

6. The two-wheel-drive bicycle of claim 5 wherein:
   the transverse sprocket arrangement includes a first central-drive sprocket attached to the center portion; and
   a second central-drive sprocket attached to the center portion and coaxially connected to the first central-drive sprocket.

7. The two-wheel-drive bicycle of claim 6 wherein:
   the transverse-drive chain includes a first chain extending from the fixed-axis intermediate rotatable transfer device to the first central-drive sprocket; and
   a second chain extending from the second central-drive sprocket to the rear sprocket.

8. The two-wheel-drive bicycle of claim 5 further comprising a clutch engaged to the transverse sprocket, whereby the front-drive mechanism can be disengaged from the main-drive-sprocket.

9. The two-wheel-drive bicycle of claim 2 wherein:
   the fixed-axis intermediate rotatable transfer device rotates about a center axis; and
   the drive-transfer wheel assembly has a center axis perpendicular to the center axis of the fixed-axis intermediate rotatable transfer device.

10. The two-wheel-drive bicycle of claim 2 wherein:
    the drive transfer wheel has a center axis;
    the fixed-axis intermediate rotatable transfer device and the variable-axis intermediate rotatable transfer device each rotate about a center axis; and
    the axes of the fixed-axis intermediate rotatable transfer device and the variable-axis intermediate rotatable transfer device are substantially perpendicular to the center axis of the drive transfer wheel.

11. The two-wheel-drive bicycle of claim 2 wherein the fixed-axis intermediate rotatable transfer device is attached to a side of the front portion of the frame opposite the variable-axis intermediate rotatable transfer device.

12. The two-wheel-drive bicycle of claim 1 wherein the gear arrangement further includes:
    a fixed-axis intermediate sprocket assembly rotatably attached to the front portion and having a first input sprocket mechanically engaged to the drive mechanism and a first output sprocket;
    a variable-axis intermediate sprocket assembly rotatably attached to the fork assembly and having a second input sprocket and a second output sprocket mechanically engaged to the front sprocket; and
    a drive transfer wheel circumscribing and rotatably attached to the fork assembly and mechanically engaged to the first output sprocket and the second input sprocket;
    thereby providing front-wheel drive while allowing pivoting of the fork assembly for bicycle steering.

13. The two-wheel-drive bicycle of claim 1 wherein the gear arrangement comprises:
    a fixed-axis intermediate sprocket assembly rotatably attached to the front portion and having a first input sprocket mechanically engaged to the drive mechanism and a first output sprocket;
    a first fixed-axis gear wheel attached to the front portion and mechanically engaged to the fixed-axis intermediate sprocket;
    a second gear wheel engaged with the first fixed-axis gear wheel, the second gear wheel circumscribing the steering axis;
    a drive shaft oriented along the steering axis, the drive shaft having a first and second end, where the first end is connected to the second gear wheel and the second end is connected to a third gear wheel oriented parallel to the second gear wheel;
    a fourth gear wheel engaged with the third gear wheel and mechanically engaged to the front sprocket.

14. The two-wheel-drive bicycle of claim 13 wherein the first, second, third and fourth gear wheels are beveled gears.

15. The two-wheel-drive bicycle of claim 13 wherein:

a transverse-drive chain engages the fixed-axis intermediate sprocket assembly to a transverse sprocket arrangement; and the transverse sprocket arrangement is connected to the center portion between the main-drive-sprocket and the top end of the center portion.

16. The two-wheel-drive bicycle of claim 15 wherein:

the transverse sprocket arrangement includes a first central-drive sprocket attached to the center portion; and a second central-drive sprocket attached to the center portion and coaxially connected to the first central-drive sprocket.

17. The two-wheel-drive bicycle of claim 15 wherein:

the transverse-drive chain includes a first chain extending from the fixed-axis intermediate sprocket assembly to the first central-drive sprocket; and a second chain extending from the second central-drive sprocket to the rear sprocket.

18. The two-wheel-drive bicycle of claim 15 further comprising a clutch, whereby the front-drive mechanism can be disengaged from the main-drive-sprocket.

19. The two-wheel-drive bicycle of claim 13 wherein a front drive chain transfers rotational drive from the fourth gear wheel to the front sprocket wheel.

20. The two-wheel-drive bicycle of claim 1 further comprising:

the rear sprocket being a primary rear sprocket;

a secondary rear sprocket attached to the primary rear sprocket;

an idler sprocket connected to the center portion between the main-drive-sprocket and the top end of the center portion; and a rear-to-front drive chain engaging the secondary rear sprocket and extending to the fixed-axis intermediate rotatable transfer device, the idler sprocket engaging, guiding and maintaining tension in the rear-to-front drive chain.

21. The two-wheel-drive bicycle of claim 20 further including a rear-hub clutch for disengaging the secondary rear sprocket from the primary rear sprocket, thereby to selectively disengage the front-wheel drive.

22. In a two-wheel-drive bicycle including a frame having front and rear portions and center portion with upper and lower ends, a fork assembly attached to the front portion and pivotable about a steering axis, a front wheel on the fork assembly and having a front power-loop engager, a rear wheel on the rear portion and having a rear power-loop engager, and a drive mechanism including a main-drive power-loop engager at the lower end of the center portion, the improvement comprising a front-drive mechanism driven by a flexible power-loop, the front-drive mechanism having a gear arrangement attached to the fork assembly, whereby the gear arrangement transfers rotational power from the drive mechanism along the steering axis to the front power-loop engager.

* * * * *

UNITED STATES PATENT AND TRADEMARK OFFICE
CERTIFICATE OF CORRECTION

PATENT NO. : 6,446,985 B1
DATED : September 10, 2002
INVENTOR(S) : Joe Tompsett

It is certified that error appears in the above-identified patent and that said Letters Patent is hereby corrected as shown below:

Title page,
Item [57], ABSTRACT, after "members", delete "," and insert -- . --.

Column 3,
Line 32, delete "the-transverse" and insert -- the transverse --.

Column 5,
Line 28, after "18.", insert -- A first transverse-drive chain 60 engages transverse sprocket arrangement 58 and --.

Signed and Sealed this

Eighth Day of April, 2003

JAMES E. ROGAN
*Director of the United States Patent and Trademark Office*